(12) United States Patent
Van Tooren et al.

(10) Patent No.: US 10,724,994 B2
(45) Date of Patent: Jul. 28, 2020

(54) STRUCTURAL HEALTH MONITORING METHOD AND SYSTEM

(71) Applicant: University of South Carolina, Columbia, SC (US)

(72) Inventors: Michael Van Tooren, Elgin, SC (US); Victor Giurgiutiu, Columbia, SC (US); Paul Ziehl, Irmo, SC (US); Bin Lin, Irmo, SC (US)

(73) Assignee: University of South Carolina, Columbia, SC (US)

( * ) Notice: Subject to any disclaimer, the term of this patent is extended or adjusted under 35 U.S.C. 154(b) by 1 day.

(21) Appl. No.: 15/378,536

(22) Filed: Dec. 14, 2016

(65) Prior Publication Data

US 2017/0168021 A1    Jun. 15, 2017

Related U.S. Application Data

(60) Provisional application No. 62/267,439, filed on Dec. 15, 2015.

(51) Int. Cl.
*G01N 29/04* (2006.01)
*G01N 29/24* (2006.01)
*G01N 29/44* (2006.01)
*B64F 5/60* (2017.01)
(Continued)

(52) U.S. Cl.
CPC ............ *G01N 29/041* (2013.01); *B64F 5/60* (2017.01); *G01N 29/2418* (2013.01); *G01N 29/2437* (2013.01); *G01N 29/44* (2013.01); *B64C 2001/0072* (2013.01); *B64D 2045/0085* (2013.01); *G01N 2291/0231* (2013.01);
(Continued)

(58) Field of Classification Search
CPC ............ G01N 29/041; G01N 29/2418; G01N 29/2437; G01N 29/44; B64F 5/60
USPC .......................................................... 73/632
See application file for complete search history.

(56) References Cited

U.S. PATENT DOCUMENTS

| 6,237,873 B1 | 5/2001 | Amaoka et al. |
| 6,459,492 B1 | 10/2002 | Hercher |
| 6,713,743 B2 | 3/2004 | Kim et al. |

(Continued)

FOREIGN PATENT DOCUMENTS

| BR | 112013030154 | 3/2017 |
| CN | 105067712 A * | 11/2015 |

(Continued)

OTHER PUBLICATIONS

Ageorges, et al. "Fusion Bonding of Polymer Composites, Engineering Materials and Processes"(2002). ISBN 1-85233-429-0. (Abstract only).

(Continued)

*Primary Examiner* — Tarun Sinha
(74) *Attorney, Agent, or Firm* — Dority & Manning, P.A.

(57) ABSTRACT

Disclosed are composite structure health monitoring (SHM) systems that incorporate aspects of both a passive SHM system and an active SHM system. Systems provide a route for continuous monitoring to recognize potentially damaging events as well as to determine the location and intensity of damage in those instances in which the event does cause damage to the structure. Systems can provide improved monitoring with a low space and weight requirement, for instance when utilized for SHM of aircraft.

11 Claims, 3 Drawing Sheets

(51) Int. Cl.
　　*B64D 45/00*　　(2006.01)
　　*B64C 1/00*　　(2006.01)
(52) U.S. Cl.
　　CPC ............... *G01N 2291/0289* (2013.01); *G01N 2291/0423* (2013.01)

(56) References Cited

U.S. PATENT DOCUMENTS

| | | |
|---|---|---|
| 6,875,501 B2 | 4/2005 | Labordus et al. |
| 6,942,830 B2 | 9/2005 | Mülhaupt et al. |
| 6,996,480 B2 | 2/2006 | Giurgiutiu et al. |
| 7,024,315 B2 | 4/2006 | Giurgiutiu |
| 7,026,014 B2 | 4/2006 | Luzinov et al. |
| 7,126,096 B1 | 10/2006 | Matsen et al. |
| 7,174,255 B2 | 2/2007 | Giurgiutiu et al. |
| 7,261,938 B2 | 8/2007 | Luziriov et al. |
| 7,665,363 B2 | 2/2010 | Ester et al. |
| 7,881,881 B2 | 2/2011 | Giurgiutiu et al. |
| 7,985,451 B2 | 7/2011 | Luzinov et al. |
| 8,389,114 B2 | 3/2013 | Luzinov et al. |
| 9,032,799 B2* | 5/2015 | Hattori ............... G01N 29/043 73/600 |
| 9,158,054 B2 | 10/2015 | Giurgiutiu et al. |
| 9,211,674 B2 | 12/2015 | Van Tooren |
| 9,581,570 B2 | 2/2017 | Caicedo et al. |
| 2004/0053027 A1 | 3/2004 | Labordus et al. |
| 2004/0069075 A1* | 4/2004 | Jakoby ............... B60R 21/01516 73/862.046 |
| 2004/0151921 A1 | 8/2004 | Labordus et al. |
| 2005/0028595 A1* | 2/2005 | Pfeifer ............... B60C 23/0408 73/715 |
| 2008/0288184 A1 | 11/2008 | Giurgiutiu et al. |
| 2009/0014919 A1 | 1/2009 | Rossfeldt et al. |
| 2009/0048789 A1 | 2/2009 | Yu et al. |
| 2010/0132469 A1* | 6/2010 | Giurgiutiu ........... G01N 29/245 73/628 |
| 2010/0291304 A1 | 11/2010 | Becker |
| 2011/0108469 A1* | 5/2011 | Yamamoto ........... G01N 29/041 209/576 |
| 2011/0259128 A1 | 10/2011 | Ziehl et al. |
| 2012/0109560 A1* | 5/2012 | Huang ............... G01M 5/0033 702/75 |
| 2012/0280414 A1 | 11/2012 | Giurgiutiu et al. |
| 2014/0082775 A1 | 3/2014 | Zahl |
| 2014/0291886 A1 | 10/2014 | Mark et al. |
| 2015/0108677 A1 | 4/2015 | Mark et al. |
| 2015/0338380 A1 | 11/2015 | Ziehl et al. |
| 2017/0044337 A1 | 2/2017 | Van Tooren et al. |
| 2017/0057167 A1 | 3/2017 | Van Tooren et al. |
| 2017/0138906 A1* | 5/2017 | Hartwig ............... G01N 29/11 |
| 2017/0168021 A1 | 6/2017 | Van Tooren et al. |
| 2017/0341301 A1 | 11/2017 | Van Tooren et al. |
| 2018/0063895 A1 | 3/2018 | Van Tooren et al. |

FOREIGN PATENT DOCUMENTS

| | | |
|---|---|---|
| WO | WO2004/085141 | 10/2004 |
| WO | WO2015/077262 | 5/2015 |
| WO | WO2015/112998 | 7/2015 |
| WO | WO2017/035313 | 3/2017 |
| WO | WO2017/210504 | 12/2017 |

OTHER PUBLICATIONS

Anderson, et al. "Ultrasonic radiation from wedges of cubic profile: Experimental results," *Ultrasonics* 63, (2015), pp. 141-146.
Assouli, et al. "Detection and identification of concrete cracking during corrosion of reinforced concrete by acoustic emission coupled to the electrochemical techniques," *NDT&E International*. 2005 38(8), pp. 682-689.
Azbaid El Ouahabi, et al. "Experimental investigation of the acoustic black hole for sound absorption in air," *ICSV22*, (2015), pp. 1-8.

Azbaid El Ouahabi, et al. "Investigation of the acoustic black hole termination for sound waves propagating in cylindrical waveguides" *44th International Congress and Exposition on Noise Control Engineering*, (2015), 10 pgs.
Bowyer, et al. "Damping of flexural vibrations in composite plates and panels containing one- and two-dimensional acoustic black holes," *Proceedings of the Acoustics* Nantes Conference, (2012), pp. 2199-2204.
Bowyer, et al. "Experimental study of damping flexural vibrations in tapered turbofan blades" *Proceedings of the Acoustics* Nantes Conference, (2012), pp. 2207-2212.
Bowyer, et al. "Damping of flexural vibrations in rectangular plates by slots of power-law profile" *Proceedings of Meetings on Acoustics* Nantes Conference, (2012), pp. 2193-2198.
Bowyer, et al. "Damping of flexural vibrations in glass fibre composite plates and honeycomb sandwich panels containing indentations of power-law profile" *Proceedings of Meetings on Acoustics* 18(1), (2012), pp. 1-13.
Bowyer, et al. "Sound radiation of rectangular plates containing tapered indentations of power law profile" *Proceedings of Meetings on Acoustics* 18(1), (2012), p. 1-13.
Bowyer, et al. "Effect of geometrical and material imperfections on damping flexural vibrations in plates with attached wedges of power law profile," *Appl. Acoust*. 73(5), (2012) pp. 514-523.
Bowyer, et al. "Experimental Investigations into the Acoustic Black Hole Effect and its Applications for reduction of Flexural Vibrations and Structure-Borne Sound," *Proceedings of the AIA-DAGA*, (2013), pp. 1-4.
Bowyer, et al. "Damping of flexural vibrations in plates containing ensembles of tapered indentations of power-law profile" *Proceedings of Meetings on Acoustics* 18, (2013), pp. 1-11.
Bowyer, et al. "Experimental investigation of damping flexural vibrations in plates containing tapered indentations of power-law profile," *Appl. Acoust*. 74(4), (2013), pp. 553-560.
Bowyer, et al. "Experimental investigation of damping flexural vibrations in glass fibre composite plates containing one- and two-dimensional acoustic black holes," *Compos. Struct*. 107, (2014), pp. 406-415.
Bowyer, et al. "Damping of flexural vibrations in turbofan blades using the acoustic black hole effect," *Appl. Acoust*. 76, (2014), pp. 359-365.
Burtovyy, et al. "Hydrophobic modification of polymer surfaces via "grafting to" approach." *Journal of Macromolecular Science Part B: Physics*, 46(1), (2007), 137-154.
Burtovyy, et al. "Modification of nylon membrane surface with thin polymer layer via "grafting to" approach" *Polymer Preprints* 48(1), (2007), 725.
Burtovyy, et al. "Polymeric membranes: surface modification by "grafting to" method and fabrication of multilayered assemblies" *Nanoscience and Nanotechnology for Chemical and Biological Defense*, 1016, (2009); pp. 289-305. (Abstract only).
Burtovyy, et al. "Surface Differential Scanning Calorimeter for Evaluation of Evaporative Cooling Efficiency" *Journal of Engineered Fibers and Fabrics* 7, (2012), pp. 58-62.
Cardone, et al. "'Absorption' effect for elastic waves by the beak-shaped boundary irregularity," *Doklady Physics* 54(3), (2009). pp. 146-150.
Chyasnavichyus, et al. "Tuning Fluorescent Response of Nanoscale Film With Polymer Grafting" *Macromolecular Rapid Communications*, 33(3), (2012), pp. 237-241.
Conlon, et al. "Enhancing the low frequency vibration reduction performance of plates with embedded Acoustic Black Holes,"*Internoise*, (2014), pp. 1-8.
Coppola et al. "Analysis of Feasibility on the Use of Fiber Bragg Grating Sensors as Ultrasound Detectors", SPIE's 8th Annual International Symposium on Smart Structures and Materials, *International Society for Optics and Photonics*, (2001), pp. 224-232.
Cuenca, et al. "Vibration damping in polygonal plates using the acoustic black hole effect: model based on the image source method," *20ème Congrès Français de Mécanique*, (2011).
Cuenca, et al. "Improving the acoustic black hole effect for vibration damping in one-dimensional structures" *Proceedings of the Acoustics* Nantes Conference, (2012), pp. 2189-2191.

(56) References Cited

OTHER PUBLICATIONS

Denis, et al. "Increasing the modal overlap factor of a beam using acoustic black hole effect" *11th International Conference on Vibration Problems*, (2013), pp. 1-9.
Denis, V. "Doctoral Thesis in Acoustics: Vibration damping in beams using the acoustic black hole effect" Université Du Maine, 2014.
Denis, et al. "Modal Overlap Factor of a beam with an acoustic black hole termination" *J. Sound Vib.* 333(12), (2014), pp. 2475-2488.
Denis, et al. "Measurement and modelling of the reflection coefficient of an Acoustic Black Hole termination" *Journal of Sound and Vibration* 349 (2015), pp. 67-79.
Denis, et al. "Scattering effects induced by imperfections on an acoustic black hole placed at a structural waveguide termination" *Journal of Sound and Vibration* 362, (2016), pp. 56-71.
Draper, et al. "Mixed Polymer Brushes by Sequential Polymer Addition: Anchoring Layer Effect" *Langmuir* 20, (2004), pp. 4064-4075.
Elbatanouny, et al. "Identification of Cracking Mechanisms in Scaled FRP Reinforced Concrete Beams using Acoustic Emission" *Experimental Mechanics*, DOI 10.1007/s11340-012-9692-3, Nov. 17, (online) 2012; 15 pages.
Elbatanouny, et al. "Corrosion Intensity Classification in Prestressed Concrete using Acoustic Emission Technique" *Proc. American Society for Nondestructive Testing (ASNT)* Fall Conference and Quality Testing Show (2011), 9 pages.
Feurtado, et al. "A normalized wave number variation parameter for acoustic black hole design"*J. Acoust. Soc. Am.* 136(2), (2014), pp. EL148-EL152.
Feurtado, et al. "Investigation of boundary-taper reflection for acoustic black hole design" *Noise Control Eng. J.* 63(5), (2015), pp. 460-466.
Fowler, et al. "New Directions in Testing," *Proc. 3$^{rd}$ International Symposium on AE from Composite Materials*, Paris, France. (1989). (Abstract only).
Georgiev, et al. "Recent progress in vibration reduction using Acoustic Black Hole effect," *10ème Congrès Français d'Acoustique*, (2010).
Georgiev, et al. "Vibration reduction of beams and plates using Acoustic Black Hole effect," *39th International Congress and Exposition on Noise Control Engineering* (2010).
Georgiev, et al. "Damping of structural vibrations in beams and elliptical plates using the acoustic black hole effect," *J. Sound Vib.* 330(11), (2011), pp. 2497-2508.
Grondel, et al. "Application of the Piezoelectricity in an Active and Passive Health Monitoring System," *Piezoelectric Materials and Devices*, (2013), IntechOpen, DOI: 10.5772/54581.
Idrissi, et al. "Study and characterization by acoustic emission and electrochemical measurements of concrete deterioration caused by reinforcement steel corrosion," *NDT&E International* 36(8), (2003), pp. 563-569.
Iyer, et al. "Polystyrene Layers Grafted to Macromolecular Anchoring Layer." *Macromolecules* 36, (2003), pp. 6519-6526.
Kovalenko, et al. "A Major Constituent of Brown Algae for Use in High-Capacity Li-Ion Batteries" *Science* 3342 (2011) pp. 75-79.
Kralovic, et al. "Damping of flexural vibrations in tapered rods of power-law profile: experimental studies," *Proc. Inst. Acoust*, 29(5), (2007), pp. 66-73.
Kralovic, et al. "Some new methods of damping impact-induced vibrations in badminton racquets," *Proc. Inst. Acoust*. 30(2), (2007), pp. 155-162.
Krylov, V. "Localized acoustic triodes of a quadratic solid wedge," *Moscow Univ. Phys. Bull.*45(6), (1990), pp. 65-69.
Krylov, V. "Acoustic 'black holes' for flexural waves and iheir potential applications" *Proceedings of the Institute of Acoustics*, (2002), pp. 25-27.
Krylov, et al. "Acoustic 'Black Boles' for Flexural Waves as Effective Vibration Dampers," *J. Sound Vib.* 274(3), (2004), pp. 605-619.
Krylov, V. "New type of vibration dampers utilising the effect of acoustic 'black holes,'" *Acta Acust. United with Acust.* 90(5), (2004), pp. 830-837.
Krylov, V. "Damping of resonant vibrations utilising the acoustic black hole effect," *International Conference on Noise and Vibration Emerging Technologies*, (2005).
Krylov, et al. "Experimental evidence of the acoustic black hole effect for flexural waves in tapered plates," *Twelfth International Congress on Sound and Vibration*, (2005).
Krylov, et al. "Experimental investigation of the acoustic black hole effect for flexural waves in tapered plates," *J. Sound Vib.* 300(1). (2007), pp. 43-49.
Krylov, V. "Propagation of plate bending waves in the vicinity of one- and two-dimensions acoustic 'black holes,'" *ECCOMAS Thematic Conference on Computation Methods in Structural Dynamics and Earthquake Engineering*, (2007).
Krylov, V. "Geometric acoustics approximation for Rayleigh and Lamb waves" *The Ninth International Conference on Condition Monitoring and Machinery Failure Prevention Technologies*, 2012.
Krylov, V. "Acoustic black holes and their applications for vibration damping and sound absorption" *Proceedings of ISMA*, (2012), pp. 933-944.
Krylov, et al. "Acoustic Black Holes: a New Approach To Vibration Damping in Light-Weight Structures" *Proceedings of the Institute of Acoustics* 35(1), (2013), pp. 184-191.
Krylov, V. "Acoustic black holes: recent developments in the theory and applications," *IEEE Trans. Ultrason. Ferroelectr. Freq. Control* 61(8), (2014), pp. 1296-1306.
Li, et al. "Fabrication of paper-based microfluidic sensors by printing." *Colloids and Surfaces B: Biointerfaces* 76(2), (2010), pp. 564-570.
Liu, et al. "To Patterned Binary Polymer Brushes via Capillary Force Lithography and Surface-Initiated Polymerization." *J. Am. Chem. Soc.* 128(25), (2006), pp. 8106-8107. (Abstract only).
Liu, et al. "Polymer Grafting via ATRP Initiated from Macroinitiator Synthesized on Surface." *Langmuir* 20, (2004), pp. 6710-6718.
Liu, et al. "Synthesis of High-Density Grafted Polymer Layers with Thickness and Grafting Density Gradients" *Langmuir* 21, (2005), pp. 11806-11813.
Liu. et al. "Segregated polymer brushes via "grafting to" and ATRP "grafting from" chain anchoring" *Controlled/Living Radical Polymerization: Progress in ATRP*, 1023, (2009), pp. 215-230. (Abstract only).
Lomonosov, et al. "Orbital-type trapping of elastic Lamb waves," *Ultrasonics* 64, (2016), pp. 58-61.
Luo, et al., "Numerical Analysis and Optimization of Optical Spectral Characteristics of Fiber Bragg Gratings Modulated by a Transverse Acoustic Wave", *Applied Optics*, 46(28), (2007), pp. 6959-6965.
Luzinov, I., "Nanofabrication of thin polymer films" Nanofibers and Nanotechnology in Textiles, Woodhead Publishing Ltd., 2007. pp. 448-469.
Luzinov, et al. "Responsive brush layers: from tailored gradients to reversibly assembled nanoparticles." *Soft Matter* 4(4), (2008), pp. 714-725.
Mangual, et al; "Acoustic-Emission-Based Characterization of Corrosion Damage in Cracked Concrete with Prestressing Strand," *ACI Materials Journal*, 2013; 110 (1), pp. 89-98.
Minardo et al., "Response of Fiber Bragg Gratings to Longitudinal Ultrasonic Waves", *IKEEE Transactions on Ultrasonics, Ferroelectrics, and Frequency Control*, 52(2), (2005), pp. 304-312.
Mirinov, M. "Propagation of a flexural wave in a plate whose thickness decreases smoothly to zero in a finite interval," *Sov. physics. Acoust.* 34(3), (1988), pp. 318-319.
Mironov, et al. "One-dimensional acoustiv waves in retarding structures with propagation velocity tending to zero," *Acoust. Phys.* 48(3), (2002) pp. 347-352.
Motornov, et al. "Field-Directed Self-Assembly with Locking Nanoparticles" *Nano Letters* 12(7), (2012), pp. 3814-3820.
Naify, et al. "Underwater acoustic omnidirectional absorber" *Appl. Phys. Lett.* 104(7), (2014), pp. 073505-1-073505-4.

(56) References Cited

OTHER PUBLICATIONS

O'Boy, et al. "Damping of flexural vibrations in rectangular plates using the acoustic black hole effect," *J. Sound Vib.* 329(22), (2010), pp. 4672-4688.
O'Boy, et al. "Point mobility of a cylindrical plate incorporating a tapered hole of power-law profile," *J. Acoust. Soc. Am.* 129(6), (2011), pp. 3475-3482.
O'Boy, et al. "Vibration of a rectangular plate with a central power-law profiled groove by the Rayleigh-Ritz method" *Applied Acoustics* 104, (2016), pp. 24-32.
Offringa, et al. "Butt-joined, Thermoplastic Stiffened-skin Concept Development," *Sampe Journal* 48(2), (2012), pp. 7-15.
Pollock, A.A; "Classical Wave Theory in Practical AE Testing. Progress in AE III," *Proceedings of the 8th International AE Symposium, Japanese Society for Nondestructive Testing*, (1986) pp. 708-721.
Ramaratnam, et al. "Ultrahydrophobic textile surface via decorating fibers with monolayer of reactive nanoparticles and non-fluorinated polymer" *The Royal Society of Chemistry*, (2007), pp. 1-5.
Remillieux, et al. "Improving the Air Coupling of Bulk Piezoelectric Transducers with Wedges of Power-Law Profiles: A Numerical Study," *Ultrasonics* 54(5). (2014), pp. 1409-1416.
Seeber, et al. "Surface grafting of thermoresponsive microgel nanoparticles" *Soft Matter* 7(21), (2011), pp. 9962-9971.
Singh, at al. "Surface modification of microporous PVDF membranes by ATRP," *Journal of Membrane Science* 262(1-2), (2005), pp. 81-90.
Swamy. "The Alkali-Silica Reaction in Concrete." Blackie and Son Ltd. New York. (1998). pp. 1-348.
Tsyalkovsky, et al. "Fluorescent Reactive-Core-Shell Composite Nanoparticles with a High Surface Concentration of Epoxy Functionalities" *Chemistry of Materials* 20(1), (2008), pp, 317-325, (Abstract only).
Van Ingen, et al. "Development of the Gulfstream G650 Induction Welded Thermoplastic Elevators and Rudder," *SAMPE International Conference & Exhibition*, 2010. (Abstract only).
Vatansever, et al. "Toward Fabric-Based Flexible Microfluidic Devices: Pointed Surface Modification for pH Sensitive Liquid Transport," *ACS Applied Materials & Interfaces* 4(9), (2012), pp. 4541-4548.
Wevers, et al. "Ultrasonic Lamb Wave Inspection of Aircraft Components Using Integrated Optical Fibre Sensing Technology", ECNDT, Mo.2.7.1, (2006) pp. 1-10.
Zdyrko, et al. "Nano-patterning with polymer brushes via solvent-assisted polymer grafting," *Soft Matter* 4, (2008), pp. 2213-2219.
Zdyrko, et al. "Toward protein imprinting with polymer brushes" *BioInterphases* 4(2), (2009), pp. FA17-FA21.
Zdyrko, et al. "Macromolecular anchoring layers for polymer grafting: comparative study." *Polymer* 47(1), (2006) pp. 272-279.
Zdyrko, et al. "Fabrication of optically active flexible polymer films with embedded chain-like arrays of silver nanoparticles." *Chem. Commun.* (2008), pp. 1284-1286.
Zdyrko, et al. "Synthesis and Surface Morphology of High-Density Poly(ethylene glycol) Grafted Layers" *Langmuir* 19(24), (2003), pp. 10179-10187.
Zdyrko, et al. "Polymer brushes as active nanolayers for tunable bacteria adhesion." *Materials Science & Engineering C* 29, (2009), pp. 680-684.
Zdyrko, et al. "Polymer Brushes by the "Grafting to" Method." *Macromolecular Rapid Communications* 32(12), (2011), pp. 859-869.
Zhang, et al. "Build Orientation Determination for Multi-material Deposition Additive Manufacturing with Continuous Fibers" *Procedia CIRP* (2016), pp. 1-6.
Zhao, et al. "Broadband energy harvesting using acoustic black hole structural tailoring," *Smart Mater. Struct.* 23(6), (2014), pp. 1-9.
Zhu, et al. "Phononic thin plates with embedded acoustic black holes," *Phys. Rev. B* 91(10), (2015), pp. 104304-104308.
Zhu, et al. "Design of embedded acoustic lenses in plate-like structures based on periodic acoustic black holes," *Proc. SPIE* 9435, (2015), p. 94350K-1-94350K-9.
Ziehl, P. "Applications of Acoustic Emission Evaluation for Civil Infrastructres," *SPIE Proc. SPIE Smart Structures NDE*, (2008), 9 pgs.

\* cited by examiner

STRUCTURAL HEALTH MONITORING METHOD AND SYSTEM

CROSS REFERENCE TO RELATED APPLICATION

This application claims filing benefit of U.S. Provisional Patent Application Ser. No. 62/267,439 having a filing date of Dec. 15, 2015, which is incorporated by reference herein in its entirety.

BACKGROUND

The development of fiber-reinforced polymeric composite materials has been of great benefit as these materials can provide excellent strength characteristics and corrosion resistance at low densities. These materials have been of particular benefit in the transportation industry, where the ability to produce light weight, strong, and resistant laminate panels has greatly enhanced efficiency of vehicles and decreased both construction and operating costs.

Laminate fiber reinforced polymeric composites are not without issues, however. For instance, material characteristics that can be highly beneficial in certain aspects, such as stiffness, can cause manufacturing and operational concerns. By way of example, impact events produced by operating conditions (e.g. impacts with foreign objects, weather events, etc.) and human errors (tool drops, ground collisions, etc.) can cause delamination and cracking in composite structures. Such concerns have led to the development of structural health monitoring (SHM) systems that have been incorporated with traditional maintenance procedures, particularly in vehicles such as aircraft, in which such damage can be easily overlooked in visual inspection but in severe operating conditions can lead to catastrophic failure and even loss of life in extreme cases.

SHM is used to determine the condition of a structure by use of sensors that are embedded in or otherwise attached to the structure. SHM is generally performed with either a passive or an active system. Passive SHM includes monitoring one or more of a number of parameters including, but not limited to, loading stress, environment action, performance indicators, and acoustic emission (for instance from cracks). Passive SHM uses sensors that "listen" but do not interact with the structure. As such, the passive method does not generally provide direct measurement of damage presence and size, but the general health state of the structure can be inferred from analysis of the response of passive sensors.

Active SHM utilizes proactive interrogation of sensors embedded in/on the structure to detect damage extent and thereby determine a more detailed analysis. Methods used for active SHM resemble those of nondestructive evaluation (NDE), e.g., ultrasonics, eddy currents, etc., with one difference being that the active SHM methods are carried out with permanently affixed sensors.

One widely used active SHM method employs piezoelectric wafer active sensors (PWAS) to determine the presence of cracks, delamination, disbonds, corrosion, etc. in composite polymer laminates. Due to similarities to NDE ultrasonics, this approach is also known as embedded ultrasonics.

While the current SHM systems have provided improvement to the art, room for further improvement exists. For instance, while passive SHM systems can provide general information with regard to possible damage-causing events, specific knowledge about the damage, including confirmed existence of the damage, is sometimes not available. Moreover, to obtain as much information as possible with a passive system, a large number of sensors may be needed, which requires a great deal of data acquisition components, processing hardware, etc. A system that includes a large number of components can take up a great deal of space and increase the weight of the structure. An active SHM system can provide greater detail with regard to location and extent of damage, but it also requires heavy and complex data acquisition and processing components, particularly when contemplating continuous monitoring of the structure, further adding to the weight and space requirements of a system.

What are needed in the art are SHM systems and methods that can continuously monitor a structure while providing information with regard to location and severity of damage due to, e.g., impact events. Moreover, a system that can provide improved monitoring outcome with minimal added weight and space requirements to the supporting structure would be of great benefit.

SUMMARY

Aspects and advantages of the invention will be set forth in part in the following description, or may be obvious from the description, or may be learned through practice of the invention.

In one embodiment disclosed is a method for monitoring the health of a structure that includes a polymeric laminate, the laminate comprising a fiber reinforced polymeric composition. The method includes monitoring a passive sensor that is embedded in the polymeric laminate and detecting a potentially damaging impact to the structure via the monitoring of the passive sensor. Following this detection, the method includes activating one or more transducers that are embedded in the polymeric laminate thereby generating Lamb waves within the laminate and then analyzing signals generated at one or more receivers in response to the Lamb waves. This analysis can provide more detailed information with regard to the potentially damaging impact. The passive system can be used to trigger awareness of the occurrence of a potentially damaging impact and then, based on information provided by the passive system, the active system can focus an interrogation in the area of the impact site to provide more detailed information with regard to the damage including, without limitation, one or more of the presence, location and severity of any damage caused by the impact.

Also disclosed are systems that can be utilized in carrying out the SHM method. In particular, a system can include components of both a passive and an active SHM monitoring system. For instance, a system can include a passive piezoelectric sensor embedded in a polymeric laminate of a structure (e.g., an aircraft). The system can also include a transducer for generating Lamb waves in the polymeric laminate and a receiver in the polymeric laminate of the structure for detecting the Lamb waves. In one embodiment, the transducer can include piezoelectric wafer active sensors (PWAS). In one embodiment, the receiver can include optical fibers in the form of Fiber Bragg Grating (FBG) sensors. A system can also include data acquisition components for both the passive and active systems, signal processing components for both the passive and active systems, as well as signal generators for the transducers of the active system. Beneficially, at least some of the components of the active SHM monitoring system can be maintained remotely from the structure, for instance for periodic and/or remote use. This can limit the space and weight requirements required for the monitoring system on the structure while still providing thorough and continuous monitoring of the health of the structure.

In another embodiment, the passive sensors can be commercially available sensors known for use as passive SHM sensors or other sensors chosen or designed to produce favorable signal-to-noise ratio and the necessary ruggedness with consideration to electrical magnetic interference, temperature, and vibration of the environment in which the system is intended to be used. One particular embodiment is an SHM system for an aircraft. Sensors can be used in either wired or wireless transmission modes, and can be attached to a structure (e.g., an aircraft skin) or to supporting structural systems that are in contact, either direct or indirect, with a composite skin. Beneficially, the number of sensors can be minimized by use of the combined monitoring approach, and once an impact event is detected in the passive mode the nature of the event can be later analyzed either with sensors in the active interrogation mode or through follow-up nondestructive evaluation, e.g., after a flight, with methods such as ultrasonics, etc. In this and other embodiments, structural analysis simulation methods (such as finite element, boundary element, etc.) can be utilized to optimize sensor placement as well as to simulate the waves generated by impact events, thereby informing the predicted sensor response.

These and other features, aspects and advantages of the present disclosure will become better understood with reference to the following description and appended claims.

BRIEF DESCRIPTION OF THE FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
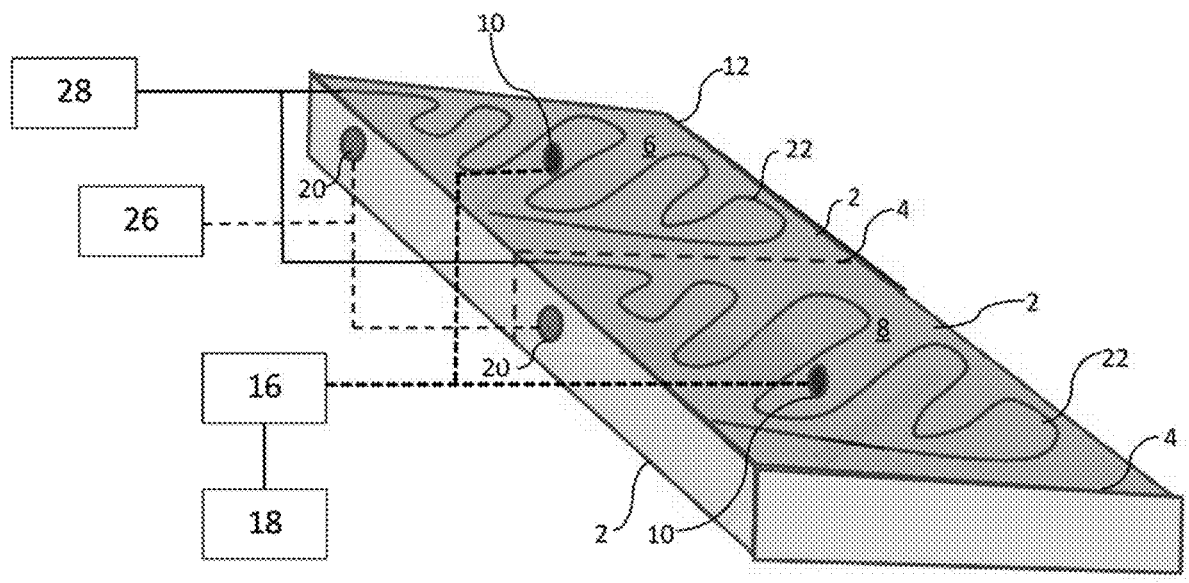
FIG. 1 schematically illustrates one embodiment of a structure incorporating a composite SHM system as described herein.

It is to be understood by one of ordinary skill in the art that the present discussion is a description of exemplary embodiments only, and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present disclosure is generally directed to composite SHM systems that incorporate aspects of both a passive SHM system and an active SHM system. Through use of the disclosed systems, a structure that includes a polymeric laminate can be continuously monitored to recognize potentially damaging events as well as to determine the location and severity of damage in those instances in which an event does cause damage to the structure. Beneficially, the systems can provide improved monitoring with a low space and weight requirement. This can be of great benefit, particularly when considering utilization of the systems with vehicles such as aircraft, for which space and weight usage can come at a high efficiency cost.

The composite SHM system can be used to inspect any number of structures in a variety of industries where detection of flaws or defects in or near a polymeric laminate is required, such as in the aircraft, automotive, marine, or construction industries. The system can be capable of detecting any number of flaws or defects within or along the surface of a polymeric laminate, such as impact damage (e.g., delaminations and matrix cracking), disbonds (e.g., airframe/reinforcing members or honeycomb composites), discontinuities, voids, or porosity, which could adversely affect the performance of the structure.

A system can include components of a passive SHM system and an active SHM system on or in a polymeric laminate or affixed to a component that is in contact with a polymeric laminate. The polymeric laminate can be a component of a structure. For instance, the polymeric laminate can form one or more walls of a multi-ribbed box structure as found on aircraft control surfaces. A structure can include additional components in conjunction with the polymeric laminate such as ribs, joints, conduits, etc. as are known in the art. The disclosed systems can be particularly beneficial when incorporated with box-type structures (i.e., structures that include a polymeric laminate in/as one or more of the wall(s) surrounding an open area), as the acoustic-based sensing technology that can be used in some embodiments of the system can be particularly effective in such structures.

A polymeric laminate can include a plurality of stacked layers attached to one another. At least one layer of the polymeric laminate can include a fiber reinforced polymeric composition. For instance, a polymeric laminate can include one or more layers of fiber reinforced thermoplastic tapes, tows, sheets, etc. and/or one or more layers of fiber reinforced thermoset tapes, tows, sheets, etc. Of course, a polymeric laminate is not limited to only layers of fiber reinforced polymeric compositions and the laminate can include layers of other materials, including, for example, a layer of polymeric composition that is not fiber reinforced, a non-polymeric layer, discontinuous layers, etc.

In one embodiment, a thermoplastic polymer of a fiber reinforced polymeric composition can be a high performance polymer that can exhibit high mechanical properties such as stiffness, toughness, and low creep that make them valuable in the manufacture of structural products such as vehicle shell structures. High performance thermoplastic polymers as may be included in a thermoplastic composition can include, for example, polyarylene sulfides, polyaryletherketones, polyetherimides, polycarbonates, polyam ides, liquid crystal polymers, etc., as well as copolymers and combinations of polymers.

A thermoset polymer of a fiber reinforced polymeric composition can include one or more thermoset polymers as are generally known in the art. For example a fiber reinforced thermoset composition can include a matrix resin selected from one or more of an epoxide, a polyimide, a bis-maleimide, a polyphenol, a polyester, etc., or combinations thereof that, when fully cured, forms a crosslinked thermoset matrix.

The fibrous reinforcement of a composition may include one or more fiber types including, without limitation, polymer fibers, glass fibers, carbon fibers, metal fibers, natural fibers such as jute, bamboo, etc., basalt fibers, and so forth, or a combination of fiber types. For instance, the fibers may be chopped fibers, continuous fibers, or fiber rovings. For example, a composite prepreg as is known in the art can be used such as a continuous carbon fiber/epoxy resin, which is a common composite material used in polymeric laminates.

As illustrated in FIG. 1, a structure 12 can be a multi-ribbed box type structure that can include segments 6, 8 separated by ribs 4. Each segment 6, 8 can include one or more polymeric laminate panels 2 in acoustic communication with one another (i.e., an acoustic wave is capable of transferring between adjacent laminate panels of the structure 12). A single panel 2 of a polymeric laminate can extend beyond a single segment 6, 8, as is known. For instance, a single polymeric laminate panel 2 can extend across the entire width of a structure such as a wing, an elevator, etc.

A structure 12 can include at least one passive sensor 10 carried on or embedded in a polymeric laminate of the structure 12 or affixed to or embedded in a component (e.g., a metallic or composite component) that is in contact with a laminate. As used herein, the term "embedded" is intended to mean that the sensors are attached directly to a surface (such as using a suitable adhesive) or are located inside a structure (such as by being located between or among layers of a laminate). The sensor 10 can be configured for acquiring data in response to ambient events associated with the structure. The sensor 10 may be attached to or embedded within the polymeric laminate, and can alternatively be carried by an appliqué or a repair patch or can be attached to or embedded within a component that is in contact with a polymeric laminate.

In conjunction with the passive sensor(s) 10, the system also includes a data acquisition system 16 capable of communicating with the passive sensor(s) 10 and a processing system 18 capable of communication with the data acquisition system 16. The data acquisition and processing systems 16, 18 are capable of providing information concerning a potential damaging event occurring to the structure based on the data acquired by the passive sensor(s) 10 in response to the ambient events.

In one embodiment, one or more components of the data acquisition and/or processing systems 16, 18 can be remote from the structure itself, which can decrease weight and space requirements of the system. For instance, a passive sensor 10 can be capable of wirelessly transmitting the acquired data to a remote component. In one embodiment, the system can include a memory device by which data from the passive sensor 10 can be stored, and at a later time, for instance at a terminal following transit, the memory device can be placed in communication with a processing system to determine from the acquired data the occurrence and general location of a potentially damaging event. Thus, the structure 12 is capable of being continuously monitored by the passive sensor(s) 10 and the integrity of the structure may be assessed by identifying any potentially damaging events that occur to the structure.

A passive sensor 10 can be any suitable sensor or transducer capable of receiving an ambient signal and transmitting or storing a response to that signal for communication with the data acquisition/processing systems. Each passive sensor 10 is typically a non-destructive sensor, such that the sensor is capable of inspecting a structure without harming the structure or requiring disassembly of the structure.

In one preferred embodiment, the passive sensor 10 can be an ultrasonic sensor, such as a piezoelectric sensor. However, various other sensors may be employed with the system, such as through-transmission, shear-wave, resonance, or mechanical impedance sensors. Furthermore, the passive sensor 10 may be any number of sizes and configurations depending on a variety of factors, such as the size, configuration, or type of material of the structure 2, the type of sensor, and/or the type of defect(s) desired to be detected. A plurality of passive sensors 10 could alternatively be arranged in an array or grid.

As the composite SHM system includes both components of a passive SHM system and components of an active SHM system, the passive portion of the composite system need not be expected to provide complete data about an event. In the present composite SHM system, the passive component of the system is utilized to recognize the occurrence of a potentially damaging ambient event. While the passive component can provide additional information in some embodiments, the composite system can utilize the active components of the composite system to provide a more detailed examination of the structure so as to detail, for instance, a more precise location of any actual damage caused by the event, the extent of the damage, and in some embodiments, the precise nature of the damage (e.g., delamination, cracks, etc.). As such, the composite system can include fewer passive sensors than previous systems, which can provide additional weight and costs savings. By way of example, a single passive sensor 10 can be utilized to monitor about 2 linear feet or more, about 4 linear feet or more, or about 5 linear feet or more of a structure in any direction from the sensor. In some embodiments, a single passive sensor 10 can monitor about 25 linear feet or less, for instance about 20 linear feet or less, or about 10 linear feet or less of a structure in any direction from the passive sensor. By way of example, in one embodiment, a structure (e.g., a single elevator of an airplane tail structure, a single wing of an aircraft, etc.) need only include a relatively small number, e.g., about 5 or less, about 3 or less, or only 1 or 2 passive sensors in order to determine that a potentially damaging event has occurred.

Each passive sensor 10 is capable of communicating with the data acquisition system wirelessly and/or through direct wired connections. For example, each sensor 10 can be capable of utilizing wireless technology, such as radio frequency emissions (e.g., via RFID, broadband, WiFi, Bluetooth®, Zigbee®, etc. communication) or other wireless techniques (e.g., via infrared communication) to communicate with the data acquisition system.

A system can include current paths or signal lines to and from each sensor 10, as needed, for example through some form of metallic deposition, etching, or bonding or via wires attached to the structure 12. The thus-formed network can serve to aggregate signals from sensors 10 such that a single cable connects the network to the data acquisition system in one embodiment. Of course, separate communication wires or cables may extend between each respective sensor 10 as is known as well.

The sensor(s) 10 are typically embedded within the polymeric laminate panel 2 of the structure 12. Alternatively, the sensor(s) can be attached to an internal or external surface of the structure, or positioned proximate or adjacent to the structure using other techniques. For instance, a passive sensor 10 can be attached directly to a polymeric laminate with various fastening techniques, such as adhesives. A passive sensor 10 can be carried by a patch or an appliqué such that the sensor acquires data indicative of a specific portion of the structure 12.

During use, a potentially damaging event at or near a passive sensor 10 can be detected by the sensor and translated to an electrical current, which can then be stored as a digital value and/or communicated to the data acquisition system. In addition, the time that the event occurred may be stored. Typically, potentially damaging events can be indicated when the data of one or more passive sensors 10 varies from standard or baseline information (e.g., data acquired at a previous maintenance check using the same technique to generate the event within the structure), with the variation typically being more than a predefined percentage or more than a predefined amount (in absolute terms).

In some embodiments, the passive system can gather additional data, such as information relating to the operating environment (e.g., temperature), maintenance (e.g., maintenance schedule or procedures), and/or specific characteristics of the structure (e.g., specifications). The data storage component can be reset, i.e., the data erased, after the data is communicated to the data acquisition system, periodically, or at any other desired time.

Pattern recognition schemes can be utilized to estimate the location and level of damage from events. For instance, pattern recognition schemes can examine data from a single sensor and/or compare data from multiple sensors (e.g., 2, 3, or 4 different sensors) to localize a potentially damage event and/or the level or type of damage caused by the event. By development and use of such data analysis schemes as well as through combination of the passive and active systems, disclosed systems can provide useful data with relatively few embedded sensors, e.g., only 1 or 2 sensors for an entire structure.

In conjunction with the passive component, the composite SHM system includes an active component. The active component of the system can include transducers attached in/on a polymeric laminate of the structure to provide further information in addition to that provided by the passive component of the system. Exemplary active SHM system components and methods as may be included in a composite SHM system have been described, for instance in U.S. Pat. Nos. 6,996,480; 7,881,881; and 7,024,315 and U.S. Patent Application Publication No. 2008/0288184, all to Giurgiutiu, et al. and all of which are incorporated herein by reference in their entirety.

With reference to FIG. 1, the active component of the composite SHM system can include one or more transducers 20 embedded in a polymeric laminate panel 2 of a structure 12. The transducers can be capable of transmitting a signal that can be detected by one or more sensors 22 embedded in a polymeric laminate of the structure. The sensors 22 are capable of communication with an electronic module for signal transmission/reception, processing and interpretation.

In one preferred embodiment, the transducers 20 can be piezoelectric wafer active sensors (PWAS). PWAS have emerged as a common element for SHM technology as by use of PWAS transducers, one they can apply a variety of damage detection methods including, without limitation, propagating acousto-ultrasonic waves, standing waves (electromechanical impedance) and phased arrays. PWAS attached directly to structural elements have gained large popularity due to their low cost, simplicity, and versatility. According to one preferred embodiment, PWAS can be used for structural sensing through generation of Lamb waves including one or more of propagating Lamb waves, standing Lamb waves (electromechanical impedance) and phased arrays. The propagating Lamb wave methods can include: pitch-catch; pulse-echo; thickness mode; and passive detection of impacts and acoustic emission (AE).

A Lamb wave is a guided acoustic wave having its propagation vectors parallel to the surface of a structure. Beneficially, Lamb waves are capable of coupling their energy throughout the structure thickness. These two characteristics make Lamb waves an ideal candidate for the active component of the SHM applications.

During use, a generator can be operative to impress a pulse having a predetermined carrier frequency upon at least one of the transducers 20 to produce ultrasonic waves over certain Lamb modes and wavelengths in the walls of a structure 12. For instance, an excitation signal from a function generator can be sent to a transducer 20 where the signal can be transformed to generate Lamb waves throughout the panels 2 of the structure 12. For example, a system can include a module 26 capable of wired or wireless communication with the transducers 20 that can include a tone-burst signal generator as is generally known in the art that can create a synthesized window-smoothed tone-burst signal with adjustable amplitude and repetition rate, a transmission beamformer (algorithm) at angle $\varphi_0$, a reception beamformer (algorithm) at angle $\varphi_0$, and a signal processor unit for signal deconvolution, time of flight (TOF), and range estimation.

In one embodiment, the module 26 can be maintained remotely from the structure 12 for periodic utilization of the active component of the composite SHM system. For instance, and as discussed at more length below, following determination by the passive component of the system that a potentially damaging event has occurred, for instance following completion of a transit cycle by a vehicle that incorporates the composite SHM system, the active component of the system can be utilized to provide additional data regarding the potentially damaging event. As such, at least a portion of the components of the active system (such as the signal generating module 26) can be maintained at a location of use, and need not be continually carried in conjunction with the structure 12. This can provide both space and weight savings for a vehicle that includes the structure 12.

Upon generation of the Lamb waves within the structure 12, the Lamb waves can travel in the structure 12 and can be reflected and/or diffracted by any structural discontinuities, boundaries, damaged areas or other anomalies. For example, the signal generation module can be controlled to direct the Lamb waves to the particular area of a potentially damaging event that was previously detected by the passive component of the system. The reflected/diffracted waves can then be detected by one or more sensors, where they can be transformed back into electric signals by operation of the individual sensors.

In one embodiment, the sensors utilized in the active mode of the composite SHM system can be point sensors, and in one particular embodiment can be PWAS that can be the same or different PWAS utilized as the signal transmitters.

In another embodiment, rather than point sensors such as those described in previously known systems including those previously incorporated herein by reference, the composite SHM system can include optical fiber sensors and in particular Fiber Bragg Gratings (FBG) 22 as illustrated in FIG. 1. Optical fiber sensors can monitor large areas without the need to cover the structure with a large number of sensors and thus can provide excellent coverage at minimal added weight. In addition, single mode optical fibers can be relatively inexpensive, don't require highly specialized expensive equipment in use and are insensitive to magnetic and electrical interferences. In use, single mode optical fiber sensors can be configured as interferometric, polarimetric or intensity sensors.

During use, Lamb waves can be launched from the transducers 20 embedded in the structure 12 at predetermined locations and detected by the sensors, e.g., FBG 22 embedded in the composite material at known locations.

FBG can be made by laterally exposing the core of a single-mode fiber to a periodic pattern of intense ultraviolet light. The exposure produces a permanent increase in the refractive index of the fiber's core, creating a fixed index modulation according to the exposure pattern. This fixed index modulation is called a grating.

At each periodic refraction change a small amount of light is reflected. All the reflected light signals combine coherently to one large reflection at a particular wavelength when the grating period is approximately half the input light's wavelength. This is referred to as the Bragg condition, and the wavelength at which this reflection occurs is called the Bragg wavelength. Light signals at wavelengths other than the Bragg wavelength, which are not phase matched, are essentially transparent. Therefore, light propagates through the grating with negligible attenuation or signal variation. Only those wavelengths that satisfy the Bragg condition are affected and strongly back-reflected. The ability to accurately preset and maintain the grating wavelength is a fundamental feature and advantage of fiber Bragg gratings.

The central wavelength of the reflected component satisfies the Bragg relation: $\lambda_{refl}=2\eta\Lambda$, with $\eta$ the index of refraction and $\Lambda$ the period of the index of refraction variation of the FBG. Due to the temperature and strain dependence of the parameters $\eta$ and $\Lambda$, the wavelength of the reflected component will also change as function of temperature and/or strain. This dependency is well known and is what allows determining the temperature or strain from the reflected FBG wavelength.

The interaction between Lamb waves and FBG sensors is simple: propagating lamb waves change the grating pitch of the sensor which then causes the Bragg wavelength to shift. By monitoring the Bragg wavelength shifts, Lamb waves can be reconstructed. The structural information, such as the existence, the size, the location and the growth of cracks, delamination, etc., can be obtained by analyzing the received Lamb waves. Theoretical analysis for the response of FBG sensors to longitudinal and transverse waves are generally known in the art, for instance as reported in Mnardo, A., et al., *Response of fiber Bragg gratings to longitudinal ultrasonic waves*. IEEE Transactions on Ultrasonics and Ferroelectrics, 2005. 52: p. 304-312, and Luo, Z. Q., et al., *Numerical analysis and optimization of optical spectral characteristics of fiber Bragg gratings modulated by a transverse acoustic wave*. Appl. Opt., 2007. 46: p. 6959-6965, respectively.

In use, the ratio between the wavelength of the Lamb wave and the grating length of the FBG sensor can to be considered according to standard methodology. For example, a numerical analysis on this ratio has been detailed in Coppola, G., *Analysis of feasibility on the use of fiber Bragg grating sensors as ultrasound detectors*. Proc. SPIE, 2001. 4328: p. 224-232, with the conclusion that only if the ratio exceeds a certain value, the Lamb waves can be characterized by FBG sensors. An ideal value of this ratio has been set at about 6:1 to allow the response of FBG sensors to be effectively independent of the Lamb wave wavelength.

FBG sensors have been used for ultrasonic/acoustic signal measurements in several different fields, but their applications for damage detections are relatively new. The conclusion of previous experimental work demonstrates that FBG sensors can be used to record the acoustic signals of an active SHM system and the results show FBG sensors offer the same quality as the ones from the more conventional point sensors.

Furthermore, the response of FBG sensors to acoustic waves is dependent on the relative positions of the signal source (e.g., the PWAS transducers) and the FBG sensors, meaning that FBG sensors have high directivity (unidirectionality). Thus, the received signal amplitude can be evaluated with respect to the directions of the incoming acoustic waves. Previous studies have shown that the amplitude in the parallel case can be 100-times stronger than the perpendicular case. Accordingly, an active component of a composite SHM system can include relative locations of the transducers 20 and the sensors 22 such that the sensor signals are optimized with regard to e.g., amplitude.

In an exemplary embodiment, if the generated Lamb waves have propagated through a delaminated area, the waves' spectral properties from the FBG sensors 22 can show a difference from those propagating through a delamination-free area. Specifically, a difference indicating differing damping characteristics can provide an indication that delamination is in the path of the wave propagation. During an active monitoring period, this process can be repeated by launching waves from a different transducer 20 and the vibration responses of the FBG sensors 22 can be monitored. Thus, by cross-monitoring with different transducers 20 and sensors 22 and comparing the response patterns and the resulting damping characteristics between the damaged and the delamination-free structure, the system can locate through triangulation the delamination area and determine the extent of the damage.

In addition to the function generating module 26, transducers 20 and sensors 22, the active component of a composite SHM system can include a data acquisition device 28, e.g., a digital oscilloscope. As with the module 26, the data acquisition device 28 can be periodically in communication with the other components of the active system and in one embodiment can be held remotely from the structure that is to be monitored. As such, the data acquisition device 28 need not be permanently carried with the structure and can be, e.g., maintained at a terminal for use following transit of a vehicle to be monitored. The data acquisition device 28 can collect information regarding the active system including information from each sensor 22 and the PWAS transducers 20 in communication with the sensors 22. For instance, once collection for one PWAS transducer 20 and the resulting sensor 22 reactions has been finalized, the cycle can be repeated for the other PWAS transducers 20 in a round-robin fashion.

In an exemplary configuration using eight transducers 20 in a PWAS array, there can be eight such measurement cycles to complete a data collection process. The function generator of the module 26 and digital oscilloscope data acquisition device 28 may be connected to a computer or other suitable processing device through a general-purpose interface bus (GPIB), such that the desired waveform of the excitation signal can be generated. Collected waveforms are then transferred to the computer for analysis.

The automation of data collection for the passive and active systems in accordance with the present technology can include two parts. A first hardware part can utilize an automatic signal switch box and a second software part can correspond to a control program. In an exemplary method of operation, digital control signals are generated by the software and sent to the switch box through a parallel port associated with a processor by way of a standard parallel cable. It should be appreciated, however, by those of ordinary skill in the art that other signal transfer methodologies and apparatus could be used, including, but not limited to, serial ports, infrared ports, USB ports, FireWire (IEEE 1394) ports, and wireless connections including WiFi and Bluetooth® technology. In addition, although reference is made herein to a computer and associated software, the use of such is not a specific requirement of the present subject matter as other devices including microprocessors, microcontrollers, application specific integrated circuit (ASIC) devices and other known devices may be employed to carry out the recited functions.

In general, the passive sensors 10 and the active transducers 20 can utilize different devices, as this can allow for ideal placement of the components of each system. This is not a requirement, however, and in some embodiments, the sensors of the passive system may also be utilized as the transducers of the active system. In this embodiment, the passive system can include a low pass filter in conjunction with the data acquisition module 16. As the interrogating signals of the active system can be high frequency signals, the low pass filter can attenuate any such signals it receives, substantially preventing them from reaching the sensitive circuitry of data acquisition module 16. However, the low pass filter can pass lower-frequency signals received by the transducers of the sensor network. In this manner, signals transmitted by the active system can be attenuated by the low pass filter, while other, lower frequency signals are passed to the data acquisition module 16 of the passive system. The data acquisition module 16 can store and/or pass these signals on the processing system 18 for analysis.

In operation, the network of sensors and transducers can be attached to a structure 12 as shown. The active module 26 can transmit signals to the transducers 20. The data acquisition module 16 can receive signals from the passive sensors 10, but does not transmit any signals thereto, and the data acquisition module 28 can receive signals from the sensors 22. The modules 26, 16, can operate essentially independently of each other, with the module 26 actively scanning the structure periodically and the module 16 monitoring the structure continually.

When the module 26 operates to scan the structure 12, a controller can direct the system to close (i.e., switch on) electrical connections for certain elements of the network, e.g., 10, 20, thus identifying which transducers are to transmit the interrogating signals. The controller can then direct the function generator of the module 26 to generate interrogating electrical waveforms, which are sent to those predetermined sensing element transducers 20 of the array. Those selected transducers which receive these electrical waveforms then generate corresponding Lamb waves. These Lamb waves propagate through the structure, arriving at other sensing elements 22 and causing them to generate electrical signals in response. These received signals are transmitted to the data acquisition device 28. The data acquisition device 28 can store, condition, and/or analyze the received signals, as well as pass the signals and/or analysis results to a host processor, as discussed.

In one embodiment, a system can optionally include a non-destructive examination device or system for further examination of a structure. By way of example, following processing by use of an active or passive component of a composite SHM system, the structure can be further analyzed by use of, and without limitation to, ultrasonic techniques, magnetic-particle techniques, liquid penetrant techniques, radiographic techniques, eddy-current testing, low coherence interferometry, and so forth as well as combinations of techniques as is known in the art.

By way of example, an ultrasonic based nondestructive examination system as described in U.S. Patent Application Publication No. 2007/0074573, incorporated herein by reference, can be utilized in conjunction with the passive and active components of the composite SHM system. Briefly, a system can include a chassis in which there exists an array of feeler-carrier devices housing the ultrasonic transducers. The head can be coupled to a displacement system, for example, a machine of the moving-bridge type or of the moving-gantry type. This can provide sufficient degrees of freedom for ensuring coupling with a curved surface. The degrees of freedom can be achieved with rotations or tiltings and vertical movements made by elements of the chassis.

By utilization of a composite SHM system, a structure can be continually monitored for damage without the necessity of carrying all of the components of both the passive and active system on-board in conjunction with the structure.

Figure 2:
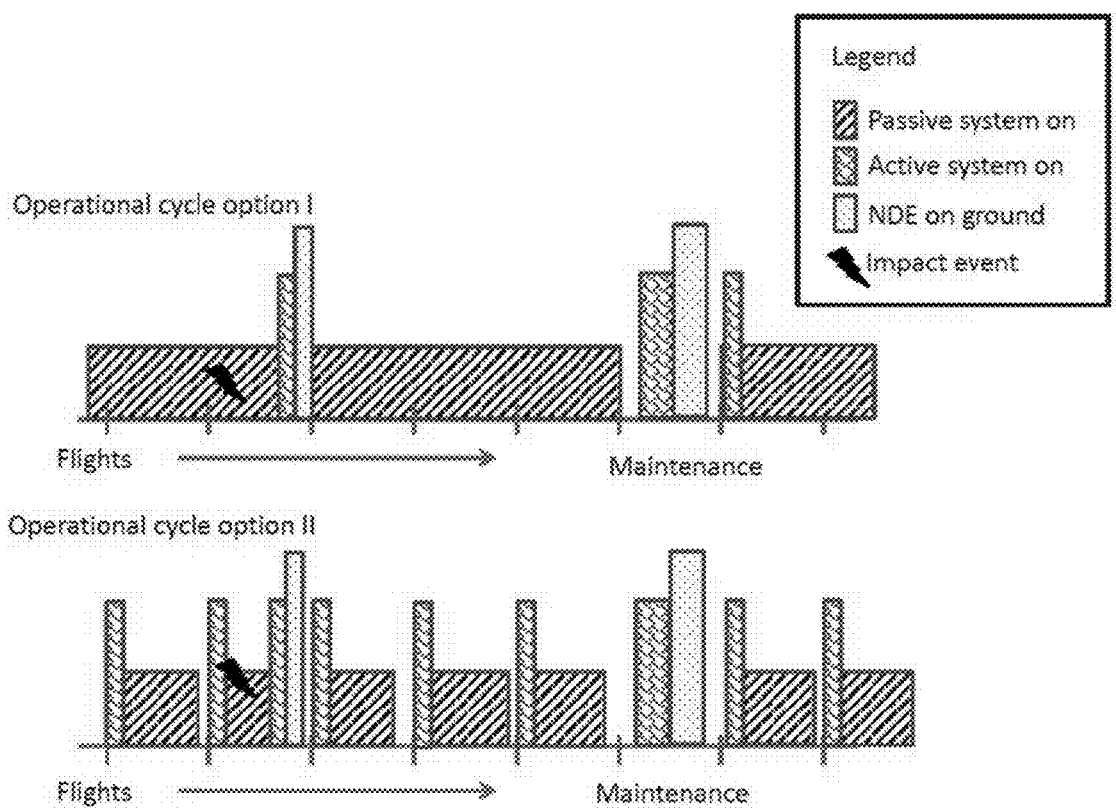
FIG. 2 illustrates two possible operational cycles according to the disclosed methods.

FIG. 2 illustrates two representative modes of operation for a system for use in monitoring the health of a transportation vehicle and in this particular embodiment, an aircraft. As can be seen, the passive system can be functional continually throughout the operation of the vehicle as well as during most or all of the time spent between flights. As such, an impact event can be recognized by the system at any time, i.e., during flight as well as during ground operations and storage.

The active component of the system can be utilized in conjunction with the passive system, generally periodically rather than continually. This allows for components of the active system to be maintained remote from the structure itself, and only held in communication with the structure and the transducers and sensors of the active system during those periods of use. For instance, upon recognition of a potentially damaging event by the passive system, and at the next opportunity (e.g., upon landing of the aircraft), the active system can be placed into use. The active system can then provide additional information with regard to the potentially damaging event and, in particular can provide information with regard to the location and severity of damage caused by the event. Alternatively, as described above, a system can optionally include a nondestructive examination device or system.

As illustrated, the active system is not limited to only those times following recognition of a potentially damaging event by the passive system. An active system evaluation can be a component of the regular schedule maintenance of a structure, can be utilized following a repair to confirm complete repair of previously determined damage, and so forth.

In the operational cycles of FIG. 2, the system can also encompass a nondestructive examination system (e.g., an ultrasonic examination) that can be carried out in conjunction with the active SHM component of the system or separately from the active SHM system, for instance to provide additional assessment of a damage area including extent and particular structural deformations of a damage event.

Through utilization of the composite SHM system, structures can be continually monitored for damage and specific information concerning the type, location and intensity of damage due to an ambient event can be obtained. Moreover, the improved monitoring can be obtained at low space and weight cost to the structure.

The present disclosure may be better understood with reference to the Example set forth below.

EXAMPLE

Figure 3:
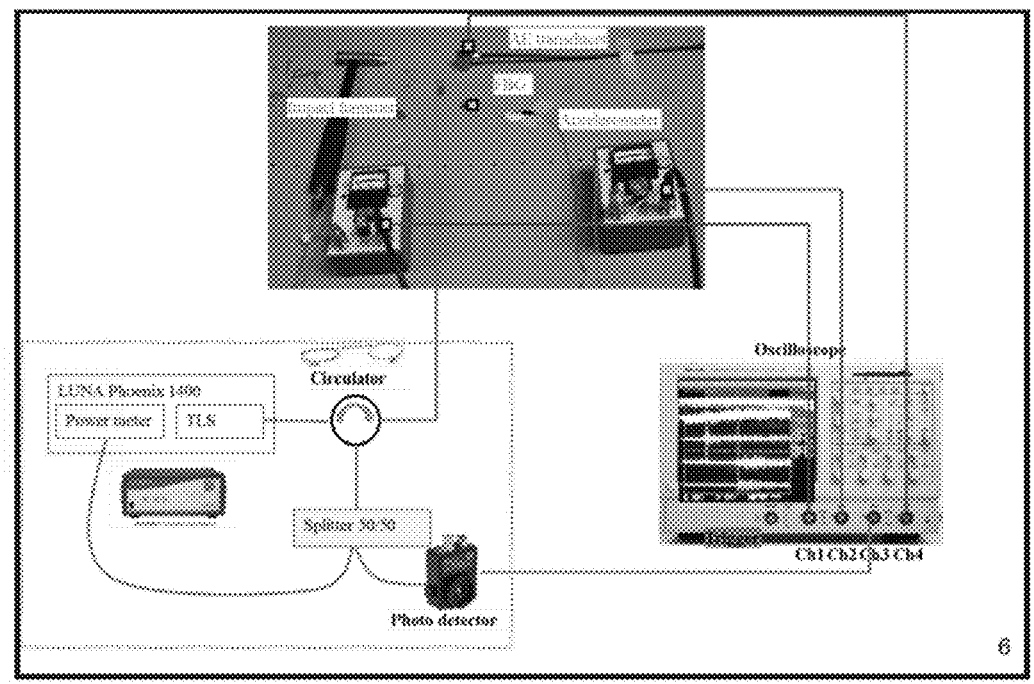
FIG. 3 illustrates a prototype system for an SHM composite system as described herein.

A prototype system was developed as illustrated in FIG. 3. Different types of SHM sensors were laid out on a typical honeycomb composite winglet. As shown in FIG. 3, there was one AE transducer (Mistras PAC AE wsa wideband transducer), one FBG ultrasonic sensor, and one accelerometer (PCB 352A10) from the PCB Piezotronics impact hammer kit installed on the winglet surface. The impact hammer model used in the example was 086C03. The impact hammer included a built-in force sensor. The force sensor was connected to a power unit, then to channel one of a Tektronix C3054 oscilloscope to record the impact, and also used as a trigger signal. The accelerometer was connected to another power unit, then to channel two of the oscilloscope. The FBG was connected to an optical intensity interrogator, and output was an analog signal to the oscilloscope channel three. The Mistras PAC AE wsa transducer was directed to the channel four of the oscilloscope. The impact test was performed at different distances from the sensor cluster, 2 ft., 5 ft. and 7 ft., and AE data was detected using a multichannel wireless AE system.

Figure 4:
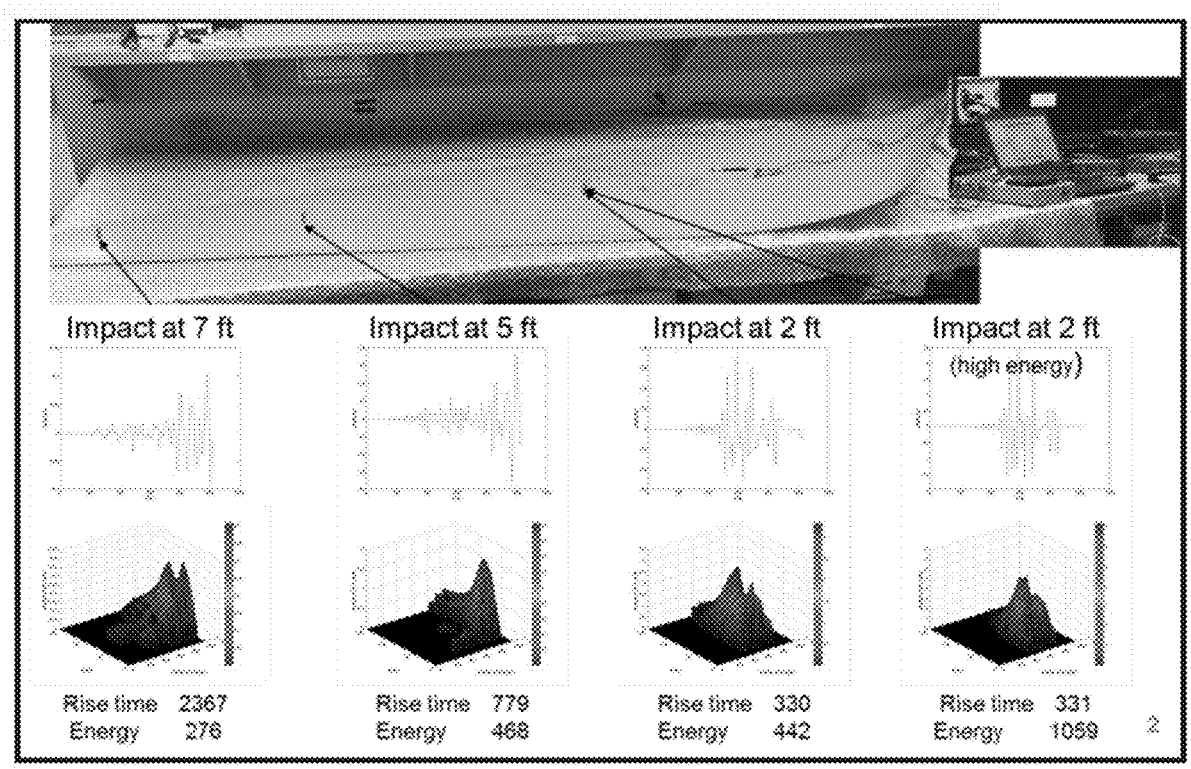
FIG. 4 illustrates the signals obtained from a passive SHM system for several different impact events at different locations on the structure of a prototype testing system.
Figure 5:
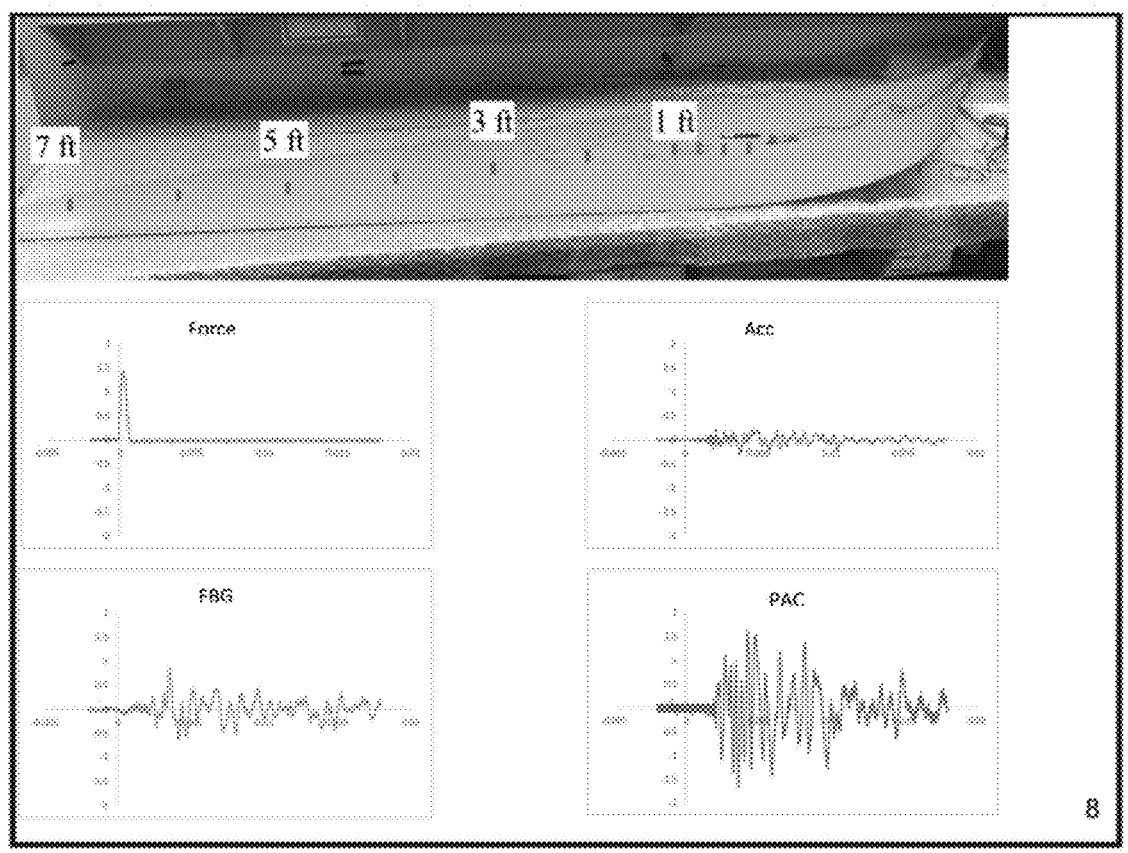
FIG. 5 illustrates the impact signal, the signal from the fiber Bragg grating (FBG) sensor, the signal from an accelerometer (Acc) and the signal from passive sensors in a prototype testing system.

FIG. 4 demonstrates one application of passive monitoring related to impact imposed at four different locations on the winglet component. Relatively low impact forces were imposed at seven, five, and two feet from the piezoelectric sensor. A relatively high impact force was also imposed at two feet from the same piezoelectric sensor. Plots of wavelet coefficients corresponding to the received data due to these impacts are shown below the winglet. This figure illustrates the use of a parameter based approach to interpretation, in this showing that rise time and energy are both associated with the source to sensor distance. In this case rise time is similar for both the low and high energy impact at two feet from the sensor, and energy is similar for low energy impacts at five and two feet from the sensor. FIG. 5 shows the different type SHM sensor responses under the impact event.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for monitoring the health of a structure, the structure including a polymeric laminate, the method comprising:

during a first maintenance check of a structure, generating a first event signal within the polymeric laminate, the structure including a piezoelectric sensor directly or indirectly in contact with the polymeric laminate;

acquiring baseline information from a first response of the piezoelectric sensor to the first event signal;

following the first maintenance check, monitoring the structure by use of the piezoelectric sensor, the piezoelectric sensor being configured to continuously monitor the structure and generate an impact signal in response to an impact to the polymeric laminate;

storing or communicating information concerning the impact signal generated following the first maintenance check;

following the impact signal generation and information storage or communication, and during a second maintenance check of the structure, generating a second event signal within the structure, the second event signal being generated by use of the same technique as was used to generate the first event signal;

acquiring data from a second response of the piezoelectric sensor to the second event signal;

analyzing the data from the second response as compared to the baseline information; and based on the analysis, determining damage to the structure due to the impact; wherein at least one component utilized in the method is maintained remotely from the structure and placed in communication or contact with the structure only periodically.

2. The method of claim 1, further comprising carrying out a non-destructive examination of the structure.

3. The method of claim 2, wherein the non-destructive examination includes examination by use of an ultrasonic technique, magnetic-particle technique, liquid penetrant technique, radiographic technique, eddy-current testing, low coherence interferometry, or combinations of non-destructive examination techniques.

4. The method of claim 1, wherein the structure is a component of an aircraft.

5. The method of claim 4, wherein the impact occurs while the aircraft is in flight.

6. The method of claim 4, wherein the structure is a multi-ribbed box type structure.

7. The method of claim 1, wherein the piezoelectric sensor is a piezoelectric wafer active sensor.

8. The method of claim 1, wherein the first event signal and the second event signal are generated within the structure by use of a transducer in contact with the polymeric laminate.

9. The method of claim 8, wherein the transducer is maintained remotely from the structure, the method further comprising placing the transducer in direct contact with the polymeric laminate.

10. The method of claim 8, wherein the transducer is a piezoelectric wafer active sensor.

11. The method of claim 1, wherein the piezoelectric sensor is affixed to or embedded in a metallic component that is in direct contact with the polymeric laminate.

* * * * *